Inventor:
Wilhelm Heemeyer
by Michael S. Striker
Atty

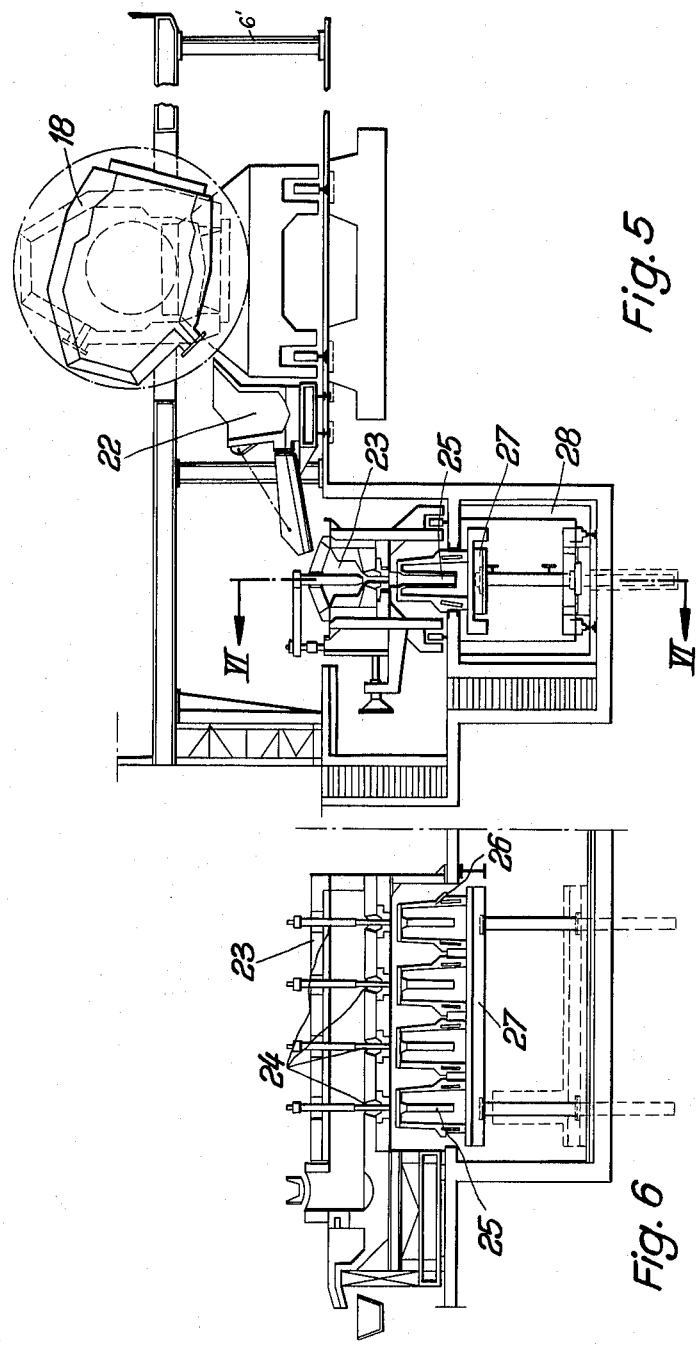

United States Patent Office 3,257,105
Patented June 21, 1966

3,257,105
STEEL PLANT LAYOUT
Wilhelm Heemeyer, Dusseldorf-Kaiserswerth, Germany, assignor to Klockner-Werke A.G., Duisburg, Germany
Filed Oct. 10, 1962, Ser. No. 229,558
Claims priority, application Germany, Oct. 11, 1961, K 44,907
17 Claims. (Cl. 266—13)

The present invention relates to a steel plant layout and more particularly to a steel plant of the type in which pig iron is molten in blast furnaces, converted into steel in converters, whereupon the steel is formed in molds, or is solidified in any other suitable manner.

Conventional steel plants include a pig iron producing system comprising a number of units, a steel-making system, and a final steel treating system, which may include roller mills. The several systems are connected to each other by transporting means which move the metal substantial distances, and which are loaded and unloaded. For example, pig iron is transported from the blast furnace by ladles supported on carriages on rails to the mixing elements of the steel plant. Thereupon, the pig iron is taken by ladles from the mixing element, and transported to the melting vessel, involving time consuming transportation, and expensive transporting systems which cover valuable plant areas. After the tapping and discharge of the steel from the steel melting vessel, the steel is transported in ladles operated by cranes and then cast into blocks which requires the transportation of molds. The supporting trucks are transported on rails, usually after a long waiting time, to the stripper hall where cranes remove the molds and place them onto other carriages for transport to the pit heating furnaces, where cranes place the molds in the furnaces. After the heat treatment, the block is finally placed on carriages running on rails to the roller mill.

It is one object of the present invention to improve the layout of a steel plant in such a manner that the number of transporting means, and the distances required for transporting the metal between the locations of the steel plant where the metal is treated are reduced to a minimum.

Another object of the invention is to combine the pig iron producing elements with the steel making elements and the steel solidifying and forming elements in self-contained production units.

It is another object of the present invention to dispose the elements of each production unit in such a manner that transport of the metal between the elements of the unit is reduced to a minimum.

It is another object of the invention to arrange a production unit in such a manner that additional production units can be added at a later time, without any interference in the operations of existent production units.

It is another object of the present invention to provide a production unit for a steel plant in which converters and other steel-making vessels directly receive iron from a blast furnace eliminating the transport of the pig iron from the blast furnace to the converter.

It is another object of the present invention to transport the pig-iron in the converter to locations where the pig-iron in the converter is transformed into steel.

It is another object of the invention to arrange the steel cooling and forming means of the plant a comparatively short distance from the locations where the pig-iron is converted into steel, so that the steel has to be transported only a comparatively short distance before solidifying in molds.

In the preferred embodiment of the invention, an LD-converter, i.e., a converter in which the oxygen blowing process is used, is directly filled with pig iron from the discharge opening of the blast furnace, and is transported along rails to the blower means where oxygen is blown through the pig iron while the same is converted into steel. A plurality of converters, and a corresponding number of blower means is provided in the proximity of the blast furnace, so that each converter has to be moved along a rail system only a short distance from the converter to the blower means.

In the event that more than 30% scrap is added to the charge of the converter, additional heating means are advantageously provided on the converter for melting the scrap, and such heating means may be supplied with oxygen, oil, or natural gas as fuel.

In one embodiment of the invention continuous casting means are spaced only a few yards from the blower means which are spaced corresponding distances from the blast furnace.

In the preferred embodiment of the invention, the blower means and the rails for the converters are arranged along a line extending in one direction, and the transport of the steel to the steel solidifying and forming means takes place along parallel paths transverse to the rails. In this manner, production units are formed which are independent of each other, so that the addition of further production units can never interfere with existent production units since the lines along which the metal is transported in each production unit never crosses the corresponding lines in other production units.

The saving on production cost achieved by the present invention is surprising. Compared with a conventional steel plant using the LD-process, and having an annual capacity of 1.4 million tons, a steel plant in accordance with the present invention reduces the cost nineteen cents per ton.

In the preferred embodimnt of the invention, a tiltable converter is used, but other steel-making means, such as an SM furnace, or a movable furnace without regenerative system conventional for SM furnaces may be used. The furnace roof arch may be omitted so that the vessel can be rapidly charged with scrap, a time period of a few minutes being sufficient. The scrap may be transported by an overhead transporting system, or by a conveyer band to the charging station where the vessel is charged. The charging stand is located directly beside the scrap yard. After charging the vessel the same is moved to a melting stand, where heating and melting of the scrap takes place.

The arrangement may be modified by providing a furnace roof arch, which may be stationary, or movable with the steel melting vessel, and which should be of such height as required by the forced oxygen process. After the charging of the scrap, the vessel may be transported to a melting stand provided at a short distance from the charging station.

The arrangements according to the prior art require the repair of SM furnaces at an undesired location, namely, at the work station. Such repairs are frequent, particularly if the forced oxygen process is used. In accordance with the present invention the steel-making vessel is mounted for movement, and may be transported directly to a repair station located outside of the production and work area so that the repair and service operation can be finished in the shortest possible time, particularly since the repairmen are not troubled by heat, smoke and dust.

One embodiment of the invention comprises a blast furnace, a steel-making vessel such as a converter, an SM furnace, or an open furnace similar to the SM furnace; steel-making means, such as blower means for blowing oxygen into the vessel for transforming iron into steel; and transporting means for transporting the vessel between a first position in which the inlet of the vessel is located to directly receive iron from the blast furnace and a second position spaced from the furnace and located in the region of the blower means so that the same transforms the iron in the vessel into steel while the vessel is in the second position.

In one embodiment of the invention mold means are located in the region of the blower means and receive steel from the vessel. In another embodiment of the invention, ladle means are located in the region of the blower means and receive steel from the vessel, whereupon the ladle means are transported to means for solidifying and forming steel. The ladles are transported along parallel lines, so that the operations of several furnaces belonging to different production units do not interfere with each other.

In the preferred embodiment of the invention, two blower means and stations, and two converters are provided for each furnace, so that one converter receives iron from the blast furnace, while the other converter is at the blower stand where the iron is transformed into steel.

The furnaces of several production units are aligned along one line, and the steel-making vessels move along a parallel line between the blower stations. The transport of the ladles filled with steel, however, takes place along parallel paths perpendicular to the above mentioned parallel lines.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 5 is a fragmentary side elevation illustrating another embodiment of the invention; and FIG. 6 is a fragmentary sectional view taken on line VI—VI in FIG. 5.

Figure 1:
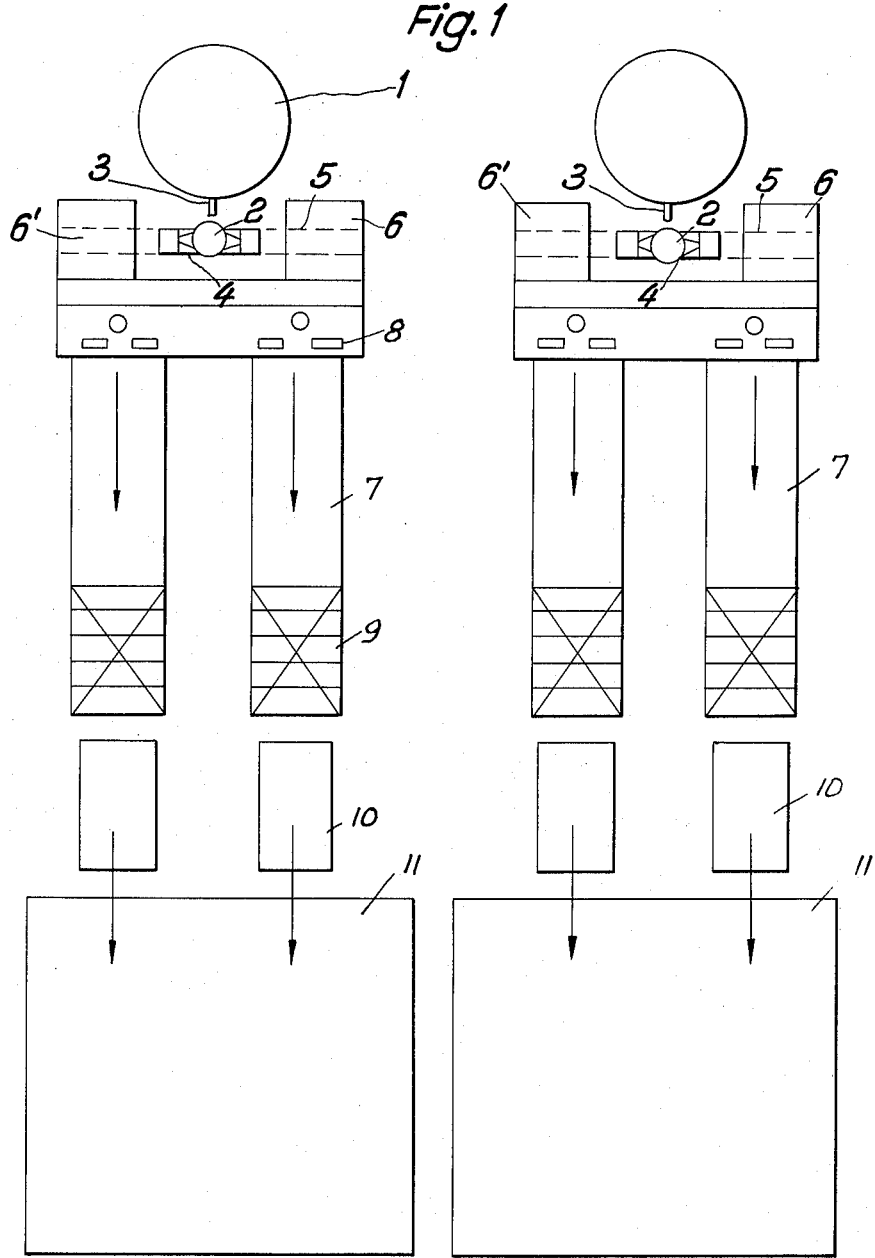
FIG. 1 is a schematic plan view illustrating the layout of a steel plant in accordance with the present invention.
Figure 2:
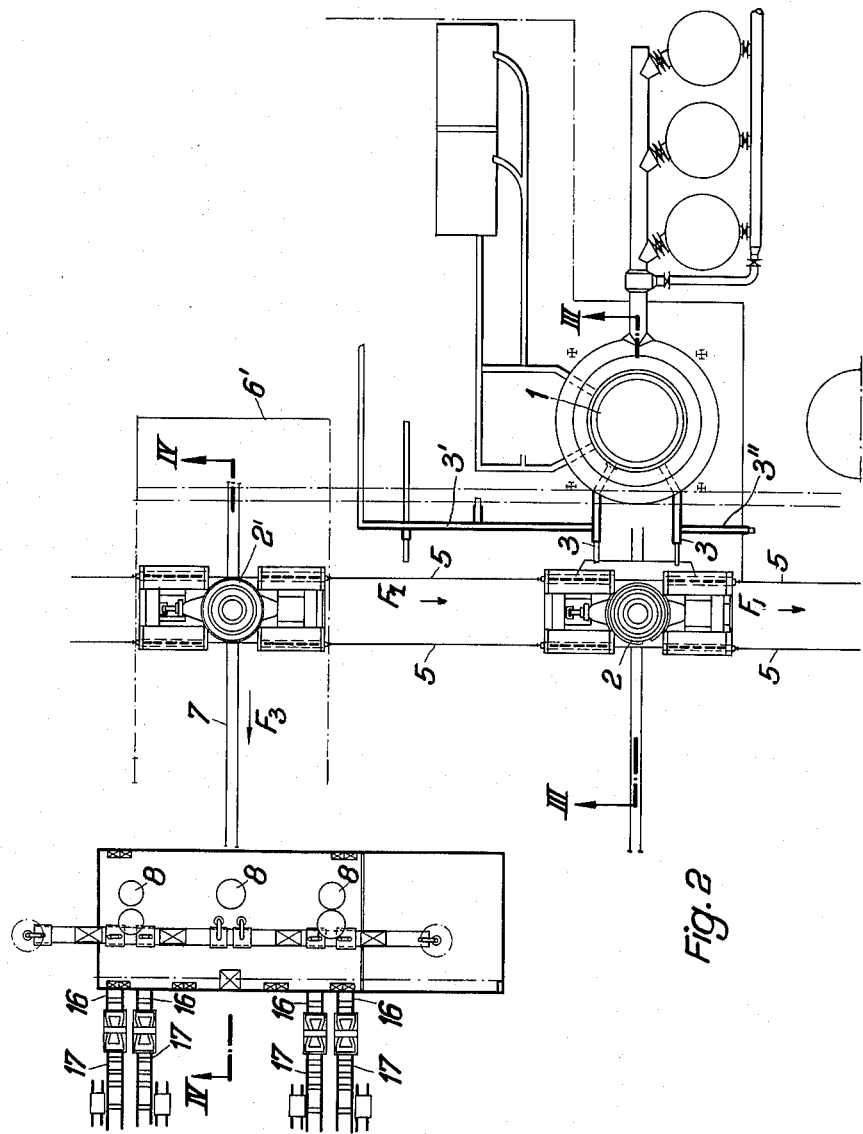
FIG. 2 is a fragmentary plan view on an enlarged scale illustrating a production unit of a steel plant according to one embodiment of the invention.

Referring now to the drawings, and more particularly to FIGS. 1 and 2, a row of blast furnaces 1 is provided each of which is part of a production unit. Each blast furnace 1 cooperates with two steel-making vessels 2, 2' but only vessel 2 is shown in FIG. 1 for the sake of simplicity. Each vessel 2 or 2' is mounted on a truck or carriage 4, which moves along a path having a track formed by rails 5. Rails 5 of all production units are aligned along a line which is parallel to the row of blast furnaces 1. The steel-making vessels 2 and 2' are respectively associated with transforming or treating stations 6 and 6' where means are provided for transforming the iron in the vessels into steel. For example, blower means for blowing oxygen into the vessels 2, 2' are provided at the stations 6 and 6'.

When the iron in the vessels is transformed into steel, it is poured into transporting ladles 8 which are movable on trucks or carriages along rails 7 to elevators or cranes 9 which raise the ladles to the elevated platform 10 of a continuous casting system 11. Rails 7 and the rails of cranes 9 are arranged on parallel lines perpendicular to the row of furnaces and to the direction of the rails 5, so that the steel is transported along parallel paths in any one and all production units. In this manner, any number of production units, of which only two are shown in FIG. 1, may be provided without interference of newly constructed production units with the operations of existen production units, since the transporting paths of the movable elements nowhere cross each other.

Figure 3:
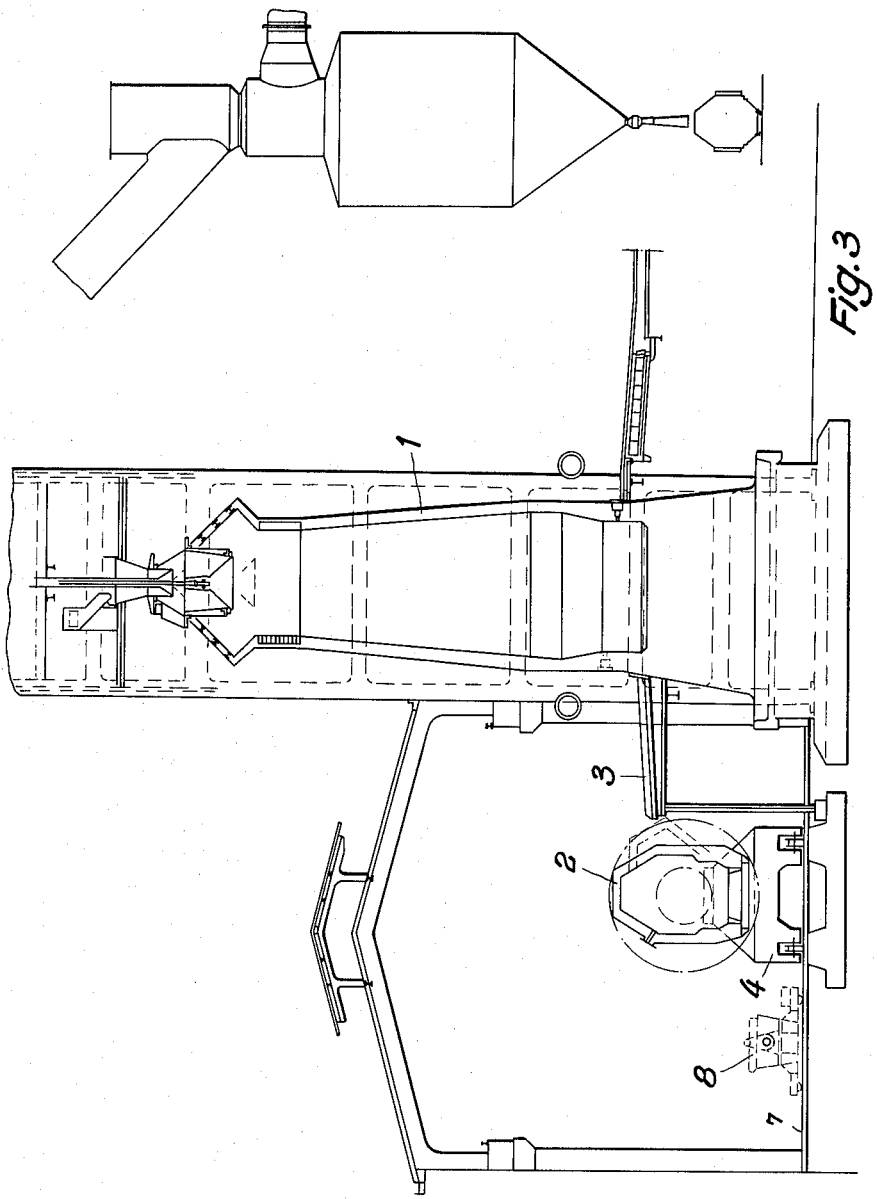
FIG. 3 is a vertical section taken along line III—III in FIG. 2.
Figure 4:
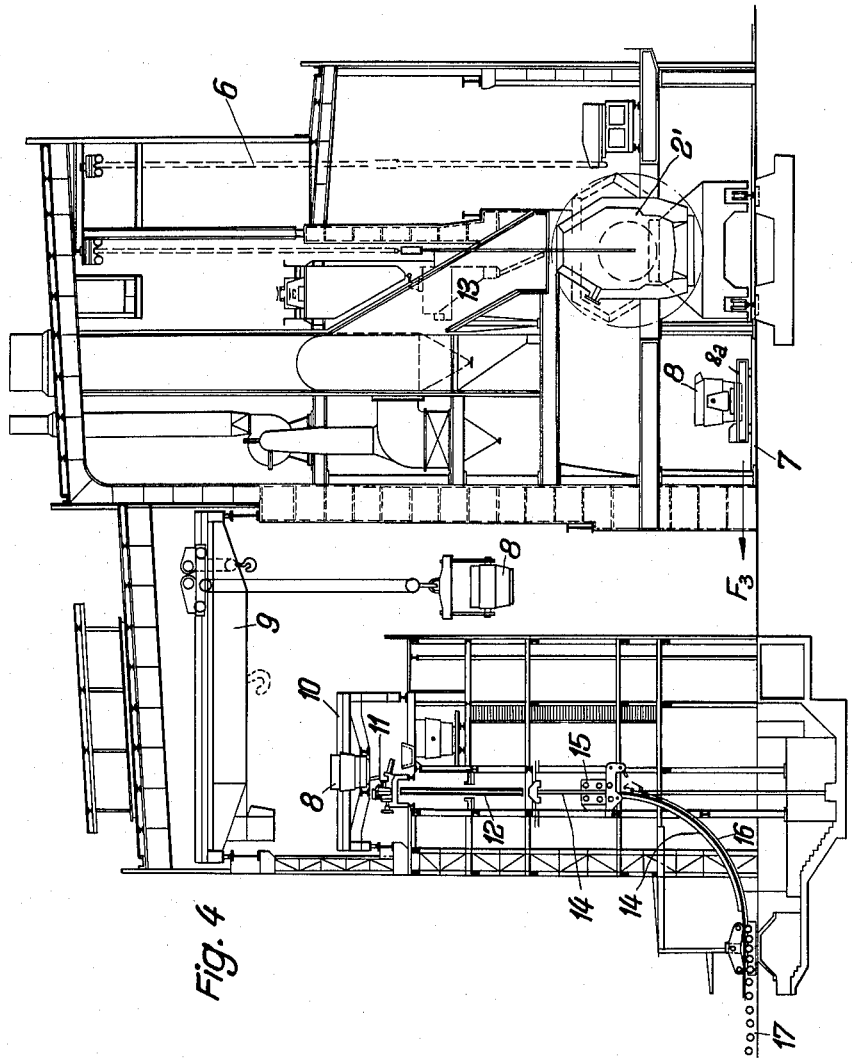
FIG. 4 is a vertical section taken along line IV—IV in FIG. 2.

FIGS. 2 to 4 illustrate one-half of a production unit in greater detail. The blast furnace has two discharge outlets communicating with two gutters 3. Only one gutter 3 is used at a time, permitting the repair of the respective other gutter after a discharge which usually causes damage to a gutter. Secondary gutters 3' and 3'' are connected to the gutters 3, and permit the deflection of the flow of discharge liquid iron away from the steelmaking vessels 2 and 2', which are shown to be tiltable converters in FIGS. 2 to 4. Converter 2' is shown to be located at a blower station 6', while converter 2 is shown to be located in a position to receive molten iron from the blast furnace. When converter 2 is filled, it is moved in the direction of the arrow $F_1$ to the blower station 6, not shown in FIG. 2, where, for example, oxygen is blown into the converter. Converter 2' was previously filled in the position in which converter 2 is shown in FIG. 2, and is now at the blower station 6', subjected to the action of the blower means. The steel in converter 2' was already poured into ladles 8 in the position of FIG. 4, so that converter 2' is ready to be moved along rails 5 in the direction of the arrow $F_2$ toward the position located opposite the discharge openings of the blast furnace 2. Of course, before converter 2' can be moved to this position, converter 2 must be moved into the direction of the arrow $F_1$ to the blower station 6. While one of the converters is being filled in the first position in which its inlet is located substantially opposite and below the discharge outlet of blast furnace 1, the contents of the other converter are treated at the stations 6 or 6' so that the iron is transformed into steel. The tapping operation and the blowing operation take place in an exactly timed sequence which is advantageous for the continuity of all operations.

FIG. 3 clearly shows that the outlet of the blast furnace 1 and the gutters 3 located above the inlet of the converter 2, so that the iron can flow directly into the converter when the same is suitably tilted, as indicated in broken lines. In this manner, any transporting means and ladles between the blast furnace 1 and the converter 2 are eliminated. The ladle 8 is movable along rails 7 between the position shown in FIG. 2 and the position shown in FIGS. 3 and 4.

In the position of FIG. 4, the open top of ladle 8, which is mounted on a carriage 8a, is located below the converter 2', so that the same can be tilted to a position in which steel is discharged therefrom into a ladle 8. The filled ladle is then moved along rail 7 into the region of the crane 9 by which it is raised, and then transported in the same direction in which rails 7 extend until the ladle 8 can be deposited on platform 10. The liquid steel is poured from each ladle 8 into a system of distributing gutters 11 from where it flows into the molds and is chilled and solidified in a continuous casting operation. The solidified steel 14 is guided to a roller system 15 and slides over a chute 16 to the roller bed 17 by which the blocks are transported to other work stations, for example to a roller mill. The ladles 8, the crane 9, the gutters 11 and the mold 12 constitute steel receiving and forming means which are aligned with the respective blower stations 6 and 6' along straight parallel lines extending perpendicular to the row of blast furnaces, and to the direction of the movement of the steel-making vessels 2 and 2'.

FIGS. 5 and 6 illustrate a modified embodiment of the invention. FIG. 5 corresponds substantially to FIG. 4, and illustrates a converter 18 at a blower station 6'. It will be understood that two converters 18 and two blower stations 6 and 6' are provided for each blast furnace 1 as explained with reference to FIG. 1. In the embodiment of FIGS. 5 and 6, no transporting means 7 and 9 are provided for ladles 8. The steel is directly cast into mold means, for example, through a filling tube or so-called snorkel filling system. As shown in FIGS. 5 and 6, the liquid steel is poured from converter 18 into a gutter 22 from where the steel flows into a distributing gutter 23 provided with several outlet openings which can be closed by plugs 24. The steel flows from gutters 23 through snorkel tubes 25 to molds 26 which are supported on an elevator platform 27 which can be raised and lowered by a hydraulic motor. In this manner, the position of the mold means can be adjusted to the height of the converter, and to the level of the gutter 22 in such a manner that the distance between the level in the molds and the spout of gutter 22 is kept substantially constant.

Chilling means are advantageously provided below the floor to chill the molds and the steel therein in the lower position of the molds. A group of molds 28 is provided. When the molds are rigidly mounted, blocks having substantially twice the length of conventional blocks can be produced in a process which is similar to a continuous casting process. When SM-furnaces are used for an oxygen process, it has been found practically impossible to charge the necessary amounts of scrap in the desired short time. This disadvantage is overcome by the present invention.

When the forced oxygen process is used for SM-furnaces, frequent repairs of the furnaces become necessary so that the increased cost of repairs will prevent any savings obtained by the increase of the efficiency of the plant. The present invention overcomes this disadvantage, since a steel-making vessel, which in accordance with the present invention is similar to an SM-furnace, can be directly transported along extended rail means 5 to a repair station, not shown, where the repairs can be carried out without the disturbances caused by heat, smoke and dust which are unavoidable when the repairs are carried out in the working area.

It will be understood that each of the elements described above, or two or more together, may also find a useful application in other types of steel plants differing from the types described above.

While the invention has been illustrated and described as embodied in a steel plant in which converters are moved directly between a blast furnace and blower stations and in which steel made in the converters is transported along parallel paths to molds, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a steel plant, in combination, a blast furnace having at least one discharge outlet; a plurality of converters, each converter having an inlet; a plurality of blower means for transforming iron into steel, said blower means being located spaced from each other and from said blast furnace along a first line; transporting means said blast furnace along a first line; transporting means for successively transporting along said first line each of said converters from a first position in which said inlet of the respective converter is located relative to said outlet to directly receive molten iron from said blast furnace, and a second position located in the region of one of said blower means, respectively, so that one of said converters receives iron from said blast furnace in said first position, while another of said converters is located in said second position in the region of said blower means so that the same transforms the iron in said other converter into steel; ladle means located in the region of each of said blower means and positioned to receive steel from the respective converter in said second position; means for solidifying and forming steel; roller mill means and other transporting means for transporting said ladle means filled with steel to said solidifying and forming means and to said roller mill means and being movable in a direction perpendicular to said first line, said solidifying and forming means, and said blast furnace being located on opposite sides of said line.

2. In a steel plant, in combination, a blast furnace having at least one discharge outlet; a plurality of converters, each converter having an inlet; a plurality of blower means for transforming iron into steel, said blower means being located spaced from each other and from said blast furnace along a first line; transporting means operating along said first line for successively transporting each of said converters from a first position in which said inlet of the respective converter is located relative to said outlet to directly receive molten iron from said blast furnace, and a second position located in the region of one of said blower means, respectively, so that one of said converters receives iron from said blast furnace in said first position, while another of said converters is located in said second position in the region of said blower means so that the same transforms the iron in said other converter into steel; ladle means located in the region of each of said blower means and positioned to receive steel from the respective converter in said second position; means for solidifying and forming steel; and other transporting means operating in a line transverse to said first direction for transporting said ladle means filled with steel along parallel paths to said solidifying and forming means, said solidifying and forming means, and said blast furnace being located on opposite sides of said line.

3. In a steel plant, in combination, a blast furnace having at least one discharge outlet; a plurality of steel making vessels, each vessel having an inlet; a plurality of transforming means for transforming iron into steel, said transforming means being located spaced from each other and from said blast furnace along a first line; transporting means for successively transporting along said first line each of said steel making vessels from a first position in which said inlet of the respective vessel is located relative to said outlet to directly receive molten iron from said blast furnace, and a second position located in the region of one of said transforming means, respectively, so that one of said steel making vessels receives iron from said blast furnace in said first position, while another of said steel making vessels is located in said second position in the region of said transforming means so that the same transforms the iron in said other vessel into steel; a plurality of steel receiving and forming means respectively associated with said transforming means, each steel receiving and forming means having a part located in the region of the respective transforming means and being located relative to the respective steel making means in said second position to receive steel from the same, said steel receiving and forming means being located along second straight lines perpendicular to said first line and including means for transporting steel along said second straight lines, said steel receiving and forming means, and said blast furnace being located on opposite sides of said first line.

4. A steel plant as set forth in claim 3 wherein said vessel is an open hearth furnace; and including a charging station for charging said vessel with scrap; a melting station for melting scrap in said vessel; and wherein said transporting means include means for transporting said vessel between said charging station and said melting station.

5. An arrangement as set forth in claim 4 wherein said vessel is open on top.

6. An arrangement as set forth in claim 4 and including a charging conveyor system at said charging station.

7. In a steel plant, in combination, a blast furnace having at least one discharge outlet; a plurality of steel making vessels, each vessel having an inlet; a plurality of transforming means for transforming iron into steel, said transforming means being located spaced from each other and from said blast furnace along a first line; transporting means for successively transporting along said first line each of said steel making vessels from a first position in which said inlet of the respective vessel is located relative to said outlet to directly receive molten iron from said blast furnace, and a second position located in the region of one of said transforming means, respectively, so that one of said steelmaking vessels receives iron from said blast furnace in said first position, while another of said steelmaking vessels is located in said second position in the region of said transforming means so that the same transforms the iron in said other vessel into steel; a plurality of mold means respectively associated with said transforming means, each mold means having a part located in the region of the respective transforming means and being located relative to the respective steelmaking means in said second position to receive steel from the same; and roller mill means, said mold means and roller mill means being located along second lines perpendicular to said first lines, said mold means and said blast furnace being located on opposite sides of said first line.

8. An arrangement as set forth in claim 7 and including means supporting said mold means for movement between higher and lower position so as to vary the position of said mold means so that the distance between steel flowing out of said steel making means and into said mold means, and the level of the steel in said mold means is maintained substantially constant.

9. An arrangement as set forth in claim 8 and including chilling means for cooling said mold means in said lower position.

10. In a steel plant, in combination, a row of blast furnaces, each having a discharge outlet for discharging iron therefrom; at least two converters associated with each blast furnace, each converter having an inlet located below the level of said discharge outlets; at least two blower means for transforming iron into steel associated with each blast furnace and located spaced from each other and from the blast furnace associated therewith, said blast furnaces and said blower means being located along two parallel straight lines; a plurality of transporting means for successively transporting along one of said parallel first lines each of said two converters from a first position in which said inlet of the respective converter is located relative to the outlet of the associated furnace to directly receive molten iron from said blast furnace, and a second position located in the region of one of the associated blower means so that one of said converters receives iron from the associated blast furnace in said first position while the other of each two converters is located in said second position in the region of said blower means so that the same transforms the iron in said other converter into steel; and a plurality of means for receiving and forming steel respectively associated with said blower means and positioned so that associated blower means, converters in said second positions, and means for receiving and forming are located along a second straight line perpendicular to said parallel first lines, said second lines being parallel to each other, said steel receiving and forming means, and said blast furnaces being located on opposite sides of said first line.

11. In a steel plant, in combination, a row of blast furnaces, each having a discharge outlet for discharging iron therefrom; at least two converters associated with each blast furnace, each converter having an inlet located below the level of said discharge outlets; at least two blower means for transforming iron into steel associated with each blast furnace and located spaced from each other and from the blast furnace associated therewith, said blast furnaces and said blower means being located along two parallel first straight lines; a plurality of transporting means for successively transporting each of said two converters along one of said parallel first lines from a first position in which said inlet of the respective converter is located relative to the outlet of the associated furnace to directly receive molten iron from said blast furnace, and a second position located in the region of one of the associated blower means so that one of said converters receives iron from the associated blast furnace in said first position while the other of each two converters is located in said second position in the region of said blower means so that the same transforms the iron in said other converter into steel; and a plurality of mold means for cooling and forming steel received from said converters and respectively associated with said blower means and positioned so that associated blower means, converters in said second position, and mold means are located along a second straight line perpendicular to said parallel first lines, said second lines being parallel to each other; and a plurality of other transporting means for transporting said ladle means, respectively, along said second lines between said converters in said second position and said cooling and forming means, said mold means and said blast furnaces being located on opposite sides of said first line.

12. In a steel plant, in combination, a row of blast furnaces, each having a discharge outlet for discharging iron therefrom; at least two converters associated with each blast furnace, each converter having an inlet located below the level of said discharge outlets; at least two blower means for transforming iron into steel associated with each blast furnace and located spaced from each other and from the blast furnace associated therewith, said blast furnaces and said blower means being located along two parallel first straight lines; a plurality of transporting means for successively transporting each of said two converters along one of said parallel first lines from a first position in which said inlet of the respective converter is located relative to the outlet of the associated furnace to directly receive molten iron from said blast furnace, and a second position located in the region of one of the associated blower means so that one of said converters receives iron from the associated blast furnace in said first position while the other of each two converters is located in said second position in the region of said blower means so that the same transforms the iron in said other converter into steel; a plurality of ladle means respectively associated with said blower means; a plurality of means for cooling and forming steel respectively associated with said blower means and positioned so that associated blower means, converters in said second position, ladle means, and means for cooling and forming are located along a second straight line perpendicular to said parallel first lines, said second lines being parallel to each other, said cooling and forming means having inlet means located at a higher level than said converters; and a plurality of other transporting means for transporting said ladle means, respectively, along said second lines between said converters in said second position and said cooling and forming means, and including crane means for raising said ladle means to a higher level, said means for cooling and forming steel and said blast furnaces being located on opposite sides of said first lines.

13. In a steel plant, in combination, a row of blast furnacees, each having at least one discharge outlet for discharging iron from said blast furnaces; a plurality of converters having inlets, each converter being associated with one of said blast furnaces and being movable to and from a position in which said inlet is located relative to the respective discharge outlet to directly receive molten iron from the associated blast furnace and in which one side of the converter faces the blast furnace; a plurality of blower means, each correlated with one of said converters to transform iron in the same into steel; a plurality of ladle means, each ladle means being positioned relative to one of said converters to receive molten steel from the same, each ladle means being located on the side of the respective converter diametrically opposite to said one side of said converter; a plurality of means for forming steel, each forming means being aligned with an associated ladle means and blower means along a straight line, said lines extending parallel to each other and perpendicular to said row of blast furnaces; and transporting means for transporting each of said ladle means along the respective line from said blower means to said forming means so that any number of blast furnaces and associated forming means can be provided without any interference of said transporting means moving along said parallel lines, said means for forming steel and said blast furnaces being located on opposite sides of said first line.

14. In a steel plant, in combination, a plurality of steel molding means respectively located along parallel first paths; a plurality of treating stations respectively located at the ends of said first paths; a second path crossing said first paths at said treating stations; blast furnace means located along said second path; and converter means movable along said second path between said blast furnace means and said treating stations.

15. In a steel plant, in combination, a plurality of stations for transforming iron into steel located spaced from each other along a path; blast furnace means located on one side of said path spaced along the same from said stations; a plurality of steel molding and forming means located on the other side of said path along lines which are transverse to said path and respectively extend to said station; converter means movable along said path from said blast furnace means to said stations for the transformation of iron therein into steel at said stations; and transporting means for receiving steel at said transforming stations from said converter means and for transporting the steel along said lines to said molding and forming means.

16. In a steel plant, in combination, two stations for transforming iron into steel located spaced from each other along a path; blast furnace means located on one side of said path spaced along the same from said stations and located between the same; two steel molding and forming means located on the other side of said path along lines which are transverse to said path and respectively extend to said stations; two converters alternatively movable along said path from said blast furnace means to said stations, respectively, for the transformation of iron therein into steel at said stations; and transporting means for receiving steel at said transforming stations from said converter means and for transporting the steel along said lines to said molding and forming means.

17. In a steel plant, in combination, a plurality of stations for transforming iron into steel located spaced from each other along a path; a track along said path; blast furnace means located on one side of said path spaced along the same from said stations; a plurality of steel molding and forming means located on the other side of said path along lines which are transverse to said path and respectively extend to said stations; converter means movable along said path on said track from said blast furnace means to said stations for the transformation of iron therein into steel at said stations; and transporting means for receiving steel at said transforming stations from said converter means and for transporting the steel along said lines to said molding and forming means, and including tracks along said lines, ladles movable along said last mentioned tracks, and crane means for moving said ladles to said molding and forming means.

References Cited by the Examiner

UNITED STATES PATENTS

| | | | |
|---|---|---|---|
| 361,653 | 4/1887 | Strobel | 266—13 X |
| 405,491 | 6/1889 | Lindenthal | 266—13 |
| 2,963,277 | 11/1960 | Morrill | 266—34 X |
| 3,013,789 | 12/1961 | Sayre et al. | 266—36 |

OTHER REFERENCES

United States Steel's Text: "Making, Shaping and Treating of Steel," 7th ed., drawing located between pages 266 and 267.

JOHN F. CAMPBELL, *Primary Examiner.*

JAMES J. TAYMAN, JR., *Examiner.*

J. J. MULLEN, *Assistant Examiner.*